T. W. POOLE.
Cultivator.
No. 21,625.
Patented Sept. 28. 1858.
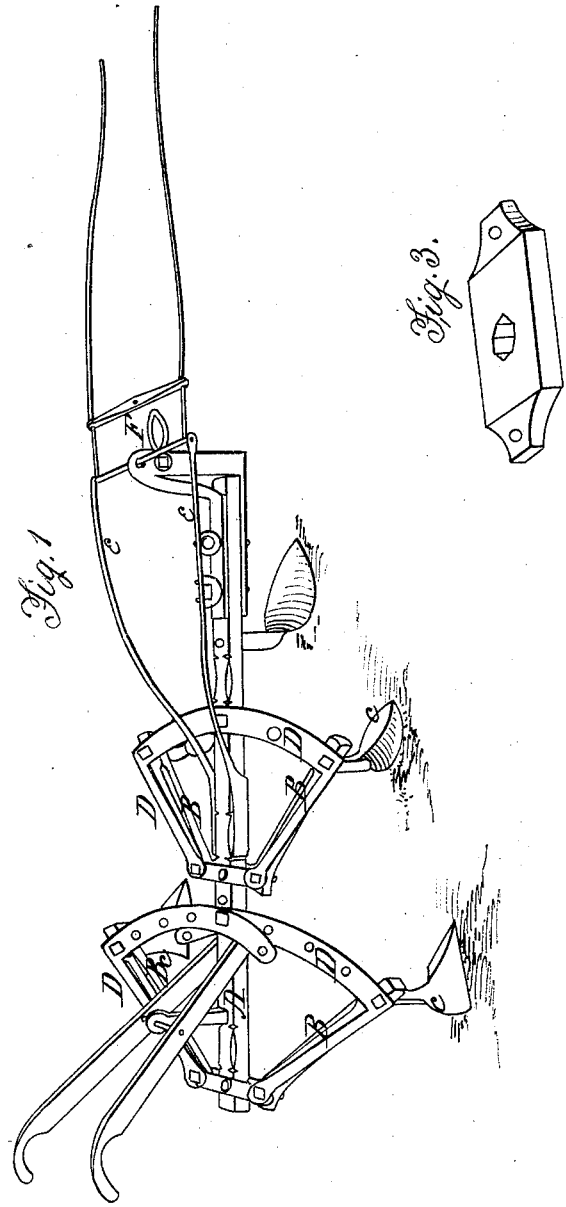
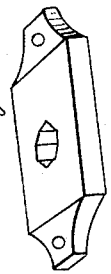
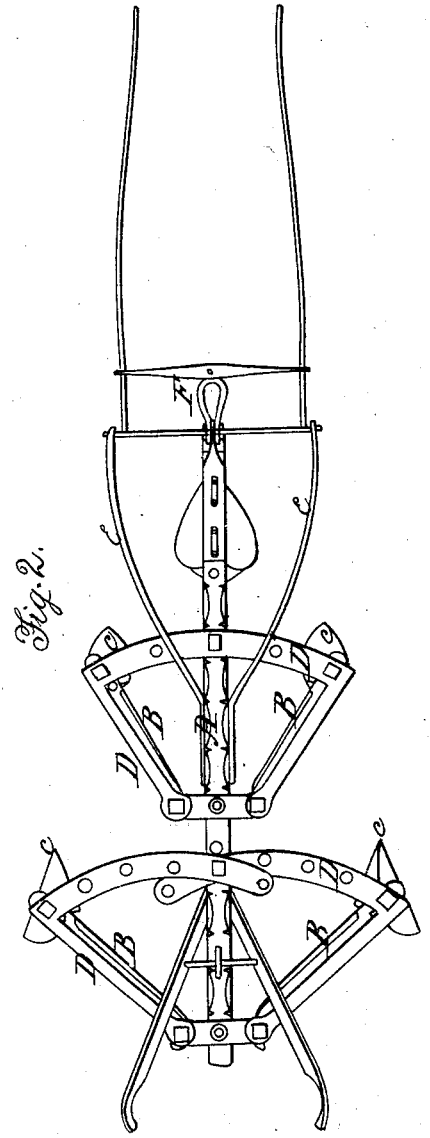
Inventor:
Thomas William Poole

UNITED STATES PATENT OFFICE.

T. W. POOLE, OF BRUNSWICK, OHIO.

IMPROVEMENT IN CULTIVATORS.

Specification forming part of Letters Patent No. 21,625, dated September 28, 1858.

*To all whom it may concern:*

Be it known that I, THOMAS WM. POOLE, of Brunswick, in the county of Medina, in the State of Ohio, have invented a new and Improved Mode of Constructing Cultivators; and I do hereby declare that the following is a full and exact description thereof, reference being had to the accompanying drawings, and to the letters of reference marked thereon.

The nature of my invention consists in constructing the cultivator with adjustable arms or wings, in combination with fixed guards secured above and concentric therewith, so that the teeth may be expanded or contracted, according to the convenience of the operator, and at the same time superior strength and firmness, as well as lightness of construction, are secured.

To enable others skilled in the art to make and use my invention, I will proceed to describe its construction and operation.

Figure 1 is a perspective view.

Fig. 2 is a top view, like letters referring to like parts. A is the beam, to which are attached by joints the arms B B B B, to the outer ends of which are attached the teeth C C C C C.

D D D are guards, having a sufficient number of holes for securing the arms in place by means of bolts. When the operator wishes to adjust his cultivator to any required width the bolts are withdrawn and the arms extended or contracted by moving their ends along the guards the bolts are inserted, and the arms held firmly in place.

Fig. 3 is a view of the lower side of the arm where the teeth are attached, it having an octagonal hole for setting the teeth in a straightforward direction when the arms are extended. I make two bent rods, E E, running forward from about the middle of the beam, to which may be attached a pair of thills for one horse. There is also a clevis, F, for attaching a pair of horses, as occasion requires.

What I claim as my invention, and desire to secure by Letters Patent, is—

The combination and arrangement of the hinged arms B B B B and fixed concentric guards D D D in the manner specified.

THOMAS WILLIAM POOLE.

Witnesses:
G. W. TIBBITS,
WILLIAM ROOT.